(12) United States Patent
Krakers

(10) Patent No.: US 10,871,168 B2
(45) Date of Patent: Dec. 22, 2020

(54) IMPELLER FOR A PUMP OR TURBINE, AND PUMP OR TURBINE WITH IMPELLER

(71) Applicant: Flowserve B.V., AE Hengelo (NL)

(72) Inventor: Lars Adriaan Krakers, LP Hengelo (NL)

(*) Notice: Subject to any disclaimer, the term of this patent is extended or adjusted under 35 U.S.C. 154(b) by 657 days.

(21) Appl. No.: 15/108,131

(22) PCT Filed: Dec. 19, 2014

(86) PCT No.: PCT/NL2014/050893
§ 371 (c)(1),
(2) Date: Jun. 24, 2016

(87) PCT Pub. No.: WO2015/099525
PCT Pub. Date: Jul. 2, 2015

(65) Prior Publication Data
US 2016/0327054 A1    Nov. 10, 2016

(30) Foreign Application Priority Data

Dec. 24, 2013  (NL) .................................. 2012024
Mar. 25, 2014  (NL) .................................. 2012503

(51) Int. Cl.
| F04D 29/16 | (2006.01) |
| F03B 3/10 | (2006.01) |
| F04D 29/18 | (2006.01) |
| F04D 29/52 | (2006.01) |
| F03B 3/12 | (2006.01) |
| F04D 29/54 | (2006.01) |

(Continued)

(52) U.S. Cl.
CPC ............ F04D 29/168 (2013.01); F03B 3/103 (2013.01); F03B 3/126 (2013.01); F03B 11/006 (2013.01); F03B 11/04 (2013.01); F04D 29/181 (2013.01); F04D 29/528 (2013.01); F04D 29/548 (2013.01); F04D 29/669 (2013.01); Y02E 10/223 (2013.01)

(58) Field of Classification Search
CPC ..................................................... F04D 29/168
See application file for complete search history.

(56) References Cited

U.S. PATENT DOCUMENTS 1,035,003 A * 8/1912 Gunther ...................... 416/176
1,865,503 A * 7/1932 Biggs ..................... F03B 3/126
                                                                    415/147

(Continued)

FOREIGN PATENT DOCUMENTS

DE    102005049794    4/2007
EP    0856665         5/2002
(Continued)

OTHER PUBLICATIONS

International Search Report and Written Opinion dated Jan. 4, 2015 in International Application No. PCT/NL2014/050893.

*Primary Examiner* — Igor Kershteyn
*Assistant Examiner* — Juan G Flores
(74) *Attorney, Agent, or Firm* — Shutts & Bowen LLP

(57) ABSTRACT

The invention relates to an impeller for a pump or turbine, comprising at least one blade, which blade is provided on the pressure side thereof with a standing edge on its outer peripheral edge zone. The invention also relates to a pump for pumping water or a turbine for generating energy from water and having a casing and such an impeller.

12 Claims, 3 Drawing Sheets

(51) Int. Cl.
   *F03B 11/00*    (2006.01)
   *F03B 11/04*    (2006.01)
   *F04D 29/66*    (2006.01)

(56) References Cited

U.S. PATENT DOCUMENTS

| | | | |
|---|---|---|---|
| 2,202,790 A * | 5/1940 | Forrest | F04D 3/005 |
| | | | 415/121.2 |
| 3,398,694 A | 8/1968 | Lerch | |
| 4,193,737 A | 3/1980 | Lemmon | |
| 6,627,174 B1 * | 9/2003 | Judat | F04D 3/02 |
| | | | 366/241 |
| 6,692,318 B2 * | 2/2004 | McBride | B63H 11/08 |
| | | | 415/191 |
| 2006/0062672 A1 | 3/2006 | McBride | |

FOREIGN PATENT DOCUMENTS

| | | |
|---|---|---|
| WO | 9825027 | 6/1998 |
| WO | 2009010310 | 1/2009 |

* cited by examiner

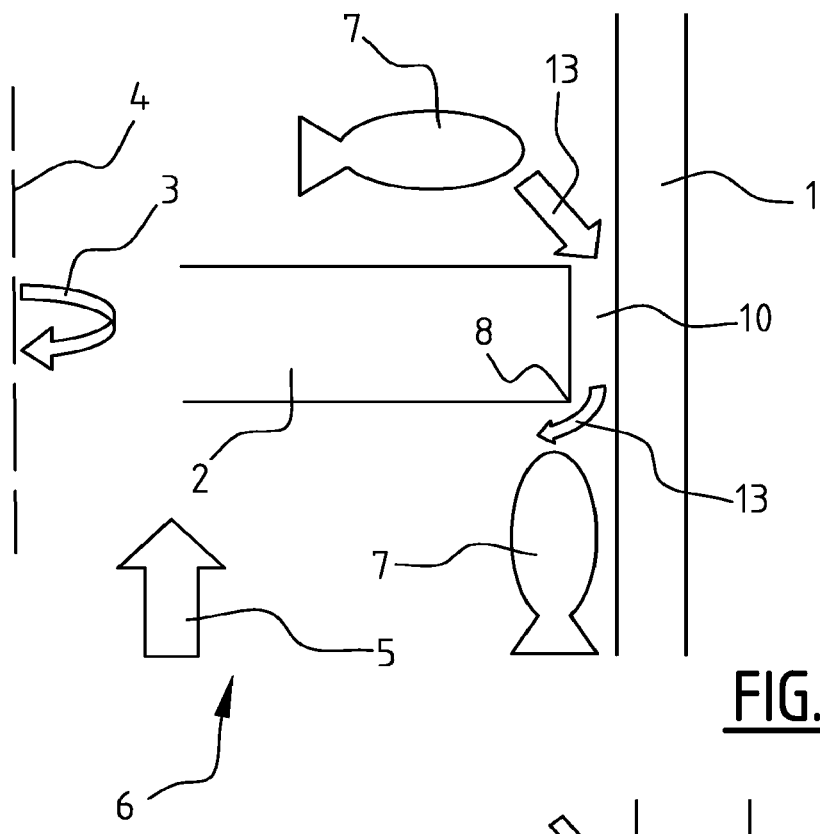
FIG. 1 - Prior Art
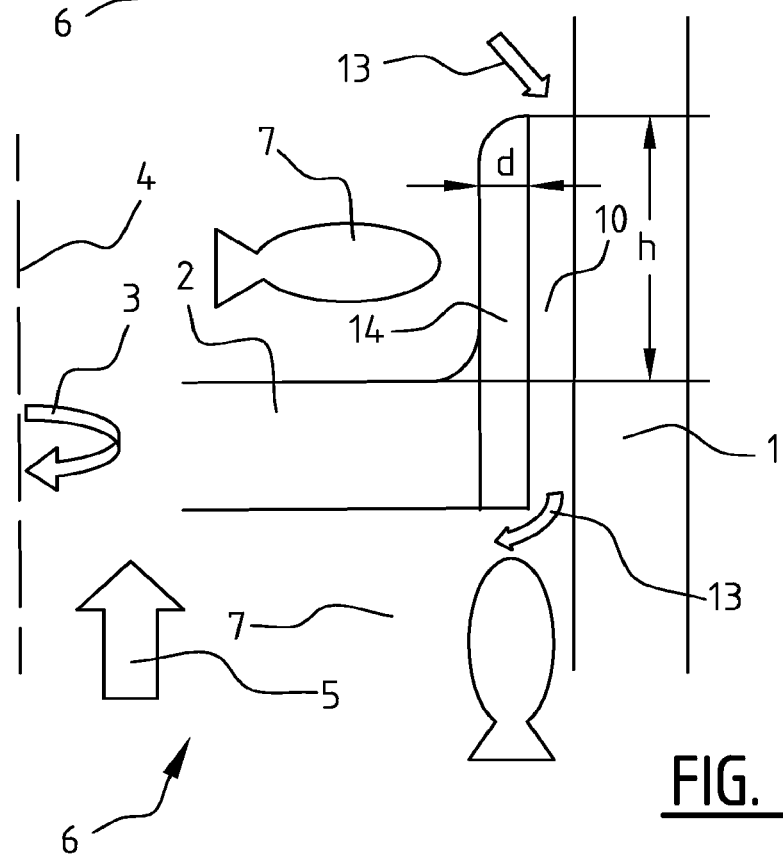
FIG. 2

IMPELLER FOR A PUMP OR TURBINE, AND PUMP OR TURBINE WITH IMPELLER

CROSS REFERENCE TO RELATED APPLICATIONS

This Non-provisional Application is a 35 USC Sect. 371 National Stage entry of PCT/NL2014/050893 entitled IMPELLER FOR A PUMP OR TURBINE, AND PUMP OR TURBINE WITH IMPELLER, filed Dec. 19, 2014 which claims the benefit of The Netherlands Application No. 2012024 filed on Dec. 24, 2013 and The Netherlands Application No. 2012503 filed on Mar. 25, 2014, the entireties of which are incorporated herein by reference.

The invention relates to an impeller for a pump or turbine comprising at least one blade. The invention more particularly relates to an open impeller, still more particularly to an axial or mixed flow impeller. The impeller is particularly intended and/or configured for a pumping engine pump or turbine. The invention also relates to a pump for pumping water, comprising a casing and an impeller disposed in the casing, the impeller comprising at least one blade. The pump according to the invention is particularly a pumping engine pump. The invention also relates to a turbine for generating energy from water, comprising a casing and an impeller disposed in the casing, the impeller comprising at least one blade. The pump and turbine can optionally be the same device, i.e. a pump turbine, wherein the flow through the impeller and the rotation of the impeller will take place in opposite directions and the device can function as pump or as turbine.

Such impellers and pumps or turbines provided with such an impeller are known. The pumps are used to carry water upward. Such a pump for carrying water upward is also referred to as a pumping engine pump. The turbines are used to generate energy from water. Such a turbine is also referred to as a pumping engine turbine. During the upward movement of water in the case of a pump or during the downward displacement of water in the case of a turbine fish present in the water can be entrained. A small gap through which water leaks away is usually present between the inner peripheral wall of the casing and the impeller. Owing to the suction force of the leaking water a fish entrained with the water can be drawn into the gap, and the fish can hereby be injured or may even die. This problem occurs particularly in the case of eels, since eels are a fish species which tends to swim along walls, i.e. in the vicinity of the gap.

A known solution for this problem is to connect the blade(s) of the impeller to the casing and to have the casing co-rotate with the impeller. A drawback hereof is the loss of efficiency due to the extra friction of the co-rotating casing.

It is an object of the invention to at least partially obviate the above described problem. It is a particular object of the invention to provide an at least relatively fish-friendly impeller, pump and turbine, more particularly with no or a relatively small loss of efficiency.

The impeller according to the invention is for this purpose characterized in that the blade is provided on the pressure side thereof with a standing edge on its outer peripheral edge zone.

The above described leakage flow runs from the pressure side to the suction side of the blade in the case of both a pump and a turbine. By providing the blade on the pressure side thereof with a standing edge on its outer peripheral edge zone the fish will swim against the standing edge and will thereby not be drawn into the gap, or there is at least a reduced chance thereof, whereby injury to and/or death of fish can be prevented or at least reduced. The leakage flow on the pressure side can be reduced by the standing edge, whereby the suction force of the leakage flow can decrease. This further reduces the chance of a fish being entrained in the leakage flow. Because the co-rotating standing edge is relatively small in relation to a co-rotating casing, the loss of efficiency will be smaller than in the case of the above described known solution.

The standing edge can extend over the whole length as well as over a part of the outer peripheral edge zone.

The standing edge can take a continuous form as well as having a number of interruptions, wherein the interruptions have a dimension such that they are smaller than a fish to be entrained.

The standing edge preferably has a height selected in accordance with a fish to be entrained during use and/or a maximum allowable loss of efficiency.

The height can for instance be adapted to an average cross-sectional dimension of an eel, since in view of the scarcity of eels it is particularly wished to prevent injury and death of this fish species. By selecting a height which is equal to the average cross-sectional dimension of the eel or other fish, and preferably greater than the average cross-sectional dimension of the eel or other fish, entraining of the eel or other fish in the leakage flow can be prevented or at least reduced. The greater the height however, the greater will be the friction and thereby the loss of efficiency. An unnecessarily great height is, preferably not therefore selected, but one in accordance with a maximum allowable loss of efficiency. The maximum allowable loss of efficiency, and thereby the height of the edge, can be selected as desired. The eventual height of the edge is therefore preferably a trade-off between the cross-sectional dimension of the fish to be entrained during use and a desirable or acceptable loss of efficiency.

The standing edge on the pressure side and/or suction side has in practical manner a height of between 2 cm and 25 cm, preferably between 3 cm and 10 cm, more preferably between 4 cm and 6 cm, still more preferably of about 5 cm.

A height of 5 cm is suitable for instance for eels, wherein the loss of efficiency can be deemed acceptable. Depending on the fish, the height can be selected as desired and differ from the above stated values.

The height is particularly selected such that the standing edge does not extend as far as an optional subsequent blade or subsequent part of the same blade as seen in axial direction.

The height of the standing edge can decrease close to a foremost and/or rearmost end zone of the blade as seen in the direction of rotation of the impeller, wherein it for instance becomes zero.

Close to the foremost and/or rearmost end zone of the blade the standing edge has no function, or a reduced one, whereby it is advantageous for the height thereof to decrease in order to keep the friction imparted by the edge as low as possible. The height of the standing edge can decrease gradually or, abruptly. The front side of the standing edge can lie flush with as well as extend forward relative to the front edge of the blade. The shape in which the height of the standing edge decreases can be selected as desired.

The height of the standing edge is preferably substantially constant along the length of the blade, if desired with the exception of said foremost and/or rearmost end zones of the blade.

The standing edge preferably extends substantially parallel to an inner peripheral surface of the casing. The angle between the pressure side surface of the blade and the standing edge is adapted hereto and can therefore vary depending on the assembly of impeller and casing. The angle between the pressure side surface of the blade and the standing edge can for instance lie between 60° and 150°. As seen in cross-section the standing edge can take a straight as well as curved form.

The blade and/or standing edge can have a relatively sharp tip close to its foremost end zone as seen in rotation direction. This tip extends close to the inner peripheral surface of the casing.

The standing edge on the blade also has a stiffness/strength-imparting function. This is because the standing edge increases the stiffness and strength of the more or less sickle-shaped tip of the blade, whereby the blade becomes more dimensionally stable.

Fish which are entrained by the pump, particularly eels which, as already stated above, tend to swim in the vicinity of the casing, can swim against the tip of the blade and/or the tip of the standing edge and thereby be injured or even die. In order to prevent this, or at least reduce the chance thereof, the casing can be provided at an inlet opening thereof, or in the case of a turbine at an outlet opening thereof, with an inward extending edge. This inward extending edge shields the sharp tip of the blade and/or standing edge, whereby the fish do not swim against it, or there is at least less chance of them doing so. Fish mortality and/or injury to fish can hereby be reduced still further with the pump according to the invention.

It is noted that the one axial end of the casing preferably defines the inlet opening. Here the casing is the peripheral wall of the inlet opening. It is also noted that the other opposite axial end of the casing preferably defines the outlet opening. Here the casing is the peripheral wall of the outlet opening. This provides a relatively large inlet and/or outlet opening for upward or downward displacement of water.

The inward extending edge preferably extends along the whole length of the inlet opening or outlet opening. That is, the inward extending edge preferably extends along the whole peripheral length of the inlet opening or outlet opening, and preferably along the whole peripheral length of the casing. During rotation of the impeller the sharp tip of the blade can be situated anywhere over the whole periphery of the inlet opening. It is therefore advantageous for the inward extending edge to extend along the whole peripheral length of the inlet opening or outlet opening.

The inward extending edge can take a continuous form as well as having a number of interruptions, wherein the interruptions have a dimension such that they are smaller than a fish to be entrained.

The inward extending edge of the casing preferably has a width which is at least equal to a thickness of the standing edge of the impeller and a dimension of a gap between the standing edge of the impeller and the inner peripheral surface of the casing. The tip of the blade and/or standing edge is hereby properly shielded.

In practical manner the inward extending edge of the casing has a width of between 1 mm and 5 cm, preferably between 5 mm and 2 cm, more preferably about 1 cm. The width is partly dependent on the diameter of the impeller. The preferred width of about 1 cm applies for an impeller with a diameter of 1 m. The values can however vary per impeller and can be selected as desired. At these values the gap has a radial thickness of between 0.2 mm and 5 mm, depending on the diameter of the impeller, and the standing edge has a thickness of between 2 mm and 4 cm, also depending on the diameter of the impeller.

The inward extending edge can for instance have a substantially constant dimension over the periphery of the inlet opening.

The angle between the inner peripheral surface of the casing and the inward extending edge can be selected as desired such that the tip of the impeller is properly shielded and there is a reduced chance of the fish swimming against it. The angle can for instance lie between 45° and 150°, more particularly between 60° and 120°, is still more particularly about 90°. The edge can be straight as well as curved as seen in cross-section. The edge can in particular take any desired form.

As already elucidated above, in the pump or turbine according to the invention the casing is disposed substantially fixedly and the impeller is configured for rotation relative to the casing.

The invention will be further elucidated with reference to figures shown in a drawing, in which:

FIG. 1 shows schematically a prior art pump;

FIG. 2 shows schematically a pump according to a first embodiment of the invention.

FIGS. 5-7 show schematically perspective views of a pump according to the second embodiment of the invention, wherein FIG. 5 shows the pump with partially omitted casing, FIG. 6 shows the pump at an angle from above, and FIG. 7 shows the pump at an angle from below.

Figure 3:
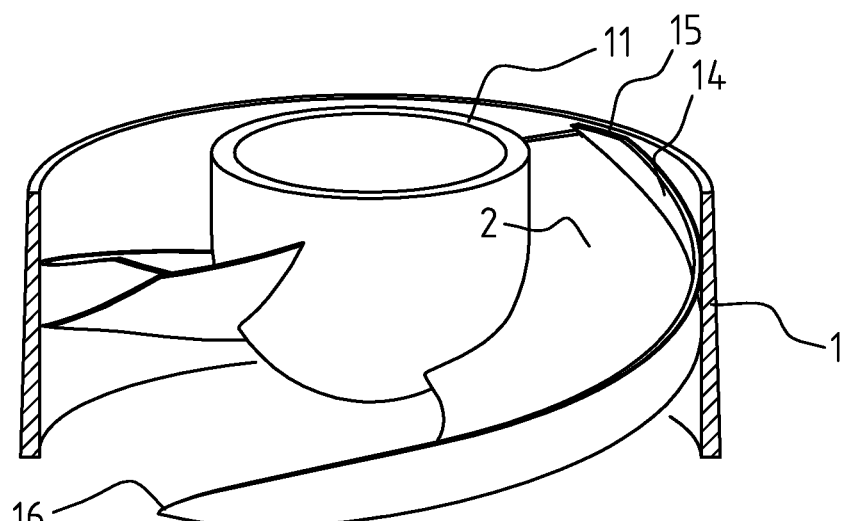
FIG. 3 shows a perspective view of the pump according to the first embodiment with partially omitted casing.

It is noted that the same components are designated in the figures with the same reference numerals. It is also noted that, of the pump, only an assembly of a casing and an impeller are shown. The other components of the pump, which are generally known to the skilled person, are omitted for the sake of simplicity.

FIG. 1 shows schematically a prior art pump. The pump comprises a casing 1 and an impeller with blade 2. The impeller with blade 2 rotates in direction 3 about a central axis 4, this central axis being the centre line of a hub (not shown). Owing to the pumping action of the pump the water is drawn in via an inlet opening 6 in direction 5. A fish 7 present in the water will swim here in the direction 5 of the indrawn water and is subsequently entrained by the impeller. Present between the inner peripheral edge of casing 1 and the impeller is a gap 10 through which water leaks away in the direction of arrows 13. Owing to the suction force of the leaking water a fish 7 entrained with the water can be drawn into gap 10, and this fish 7 can be injured or even die as a result.

FIG. 2 shows schematically the pump according to the invention, wherein blade 2 is provided on the pressure side thereof with a standing edge 14 on its outer peripheral edge zone. This standing edge 14 can effectively prevent, or reduce the chance of, the fish being drawn into gap 10 in that fish 7 swims against edge 14. A leakage flow 13 is still present, although this leakage flow is smaller than in the pump of FIG. 1. The chance of a fish 7 being drawn along into gap 10 is hereby further reduced. Standing edge 14 has a height h, a thickness d and extends substantially parallel to the inner peripheral surface of casing 1.

FIG. 3 shows a perspective view of the pump of FIG. 2. Shown clearly herein is the blade 2 with standing edge 14 and mounted on hub 11. It will be apparent herefrom that, close to the foremost end zone 16 and rearmost end zone 15 of blade 2 in rotation direction 3, the edge 14 gradually decreases to zero.

In addition to the above specified fish-friendly function of standing edge 14, standing edge 14 also has a stiffness/strength-imparting function. This is because standing edge 14 increases the stiffness and strength of the more or less sickle-like tip of blade 2, whereby blade 2 becomes more dimensionally stable and more vibration-resistant.

It will further be apparent from FIG. 3 that the impeller comprises two blades 2. It is desirable with a view to fish-friendliness of the pump to provide the fewest possible blades, for instance one or in this case two blades. The impeller can alternatively comprise three, four or more blades, although the fish-friendliness of the pump is thereby reduced.

The form of blades 2 is more or less sickle-like, which has been found to be a fish-friendly form.

The impeller preferably rotates at a relatively low rotation speed, for instance 200 rpm for an impeller with a diameter of 1 m at a flow rate of 1 m³/s and lifting height of 2 m, this further enhancing the fish friendliness.

FIG. 1 also shows that the fish 7 which is present in the water and which swims in the direction 5 of the indrawn water can swim against blade 2 of the impeller. The blade can have a sharp tip 8 and/or the standing edge can have a sharp tip 16 on their foremost end zones as seen in rotation direction 3. When fish 7 swims against the sharp tip 8 or sharp tip 16 fish 7 can thereby be injured or even die.

Figure 4:
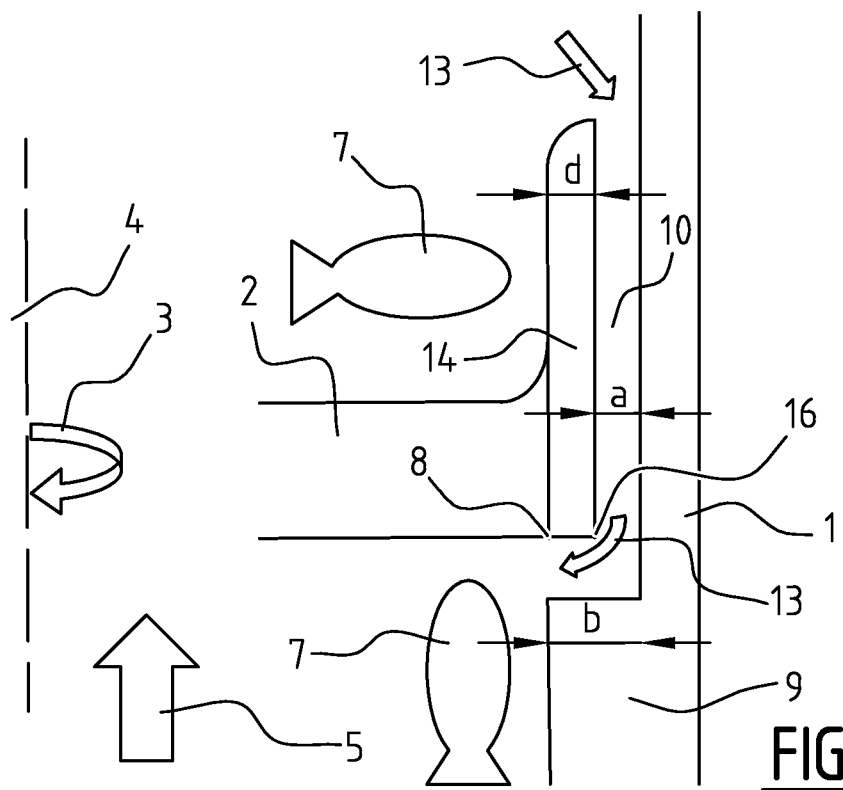
FIG. 4 shows schematically a pump according to a second embodiment of the invention.

In order to obviate this further problem of the pump of FIG. 1, FIG. 4 shows a second embodiment of the pump wherein casing 1 is provided at its inlet opening 6 with an inward extending edge 9. Edge 9 has a width b which is slightly larger than the sum of the dimension a of a gap 10 between blade 2 and the inner peripheral surface of casing 1 and the thickness d of edge 14 such that edge 9 shields the sharp tip 8 of blade 2 and/or sharp tip 16 of standing edge 14. This effectively prevents, or can at least reduce the chance of fish 7 swimming against sharp tip 8.

Figure 5:
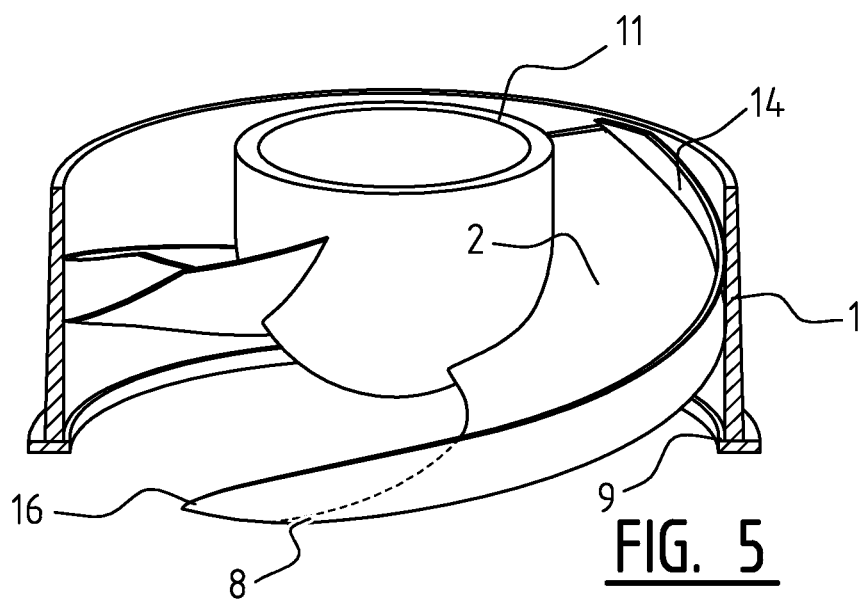
Figure 6:
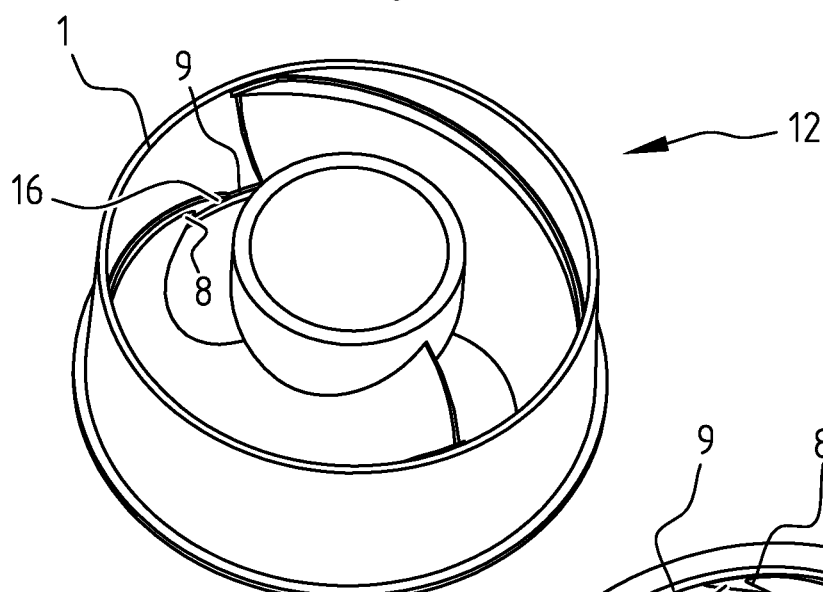
Figure 7:
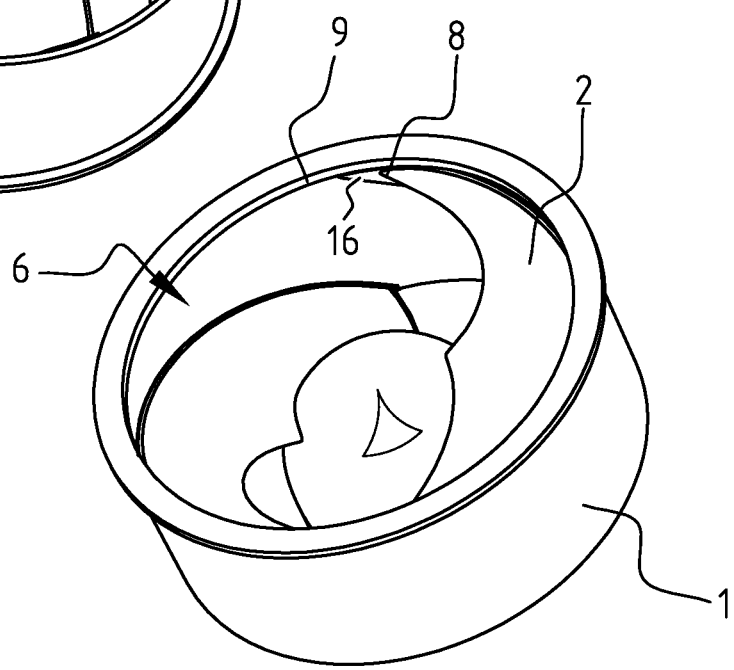

FIGS. 5-7 show perspective views of the pump of FIG. 4. It can be readily seen in for instance FIG. 6 that edge 9 extends just beyond the tip 8 of blade 2 and/or sharp tip 16 of standing edge 14, whereby tip 8 and/or tip 16 is shielded thereby. FIG. 6 shows casing 1 with impeller from above, or on the side of outlet opening 12 of casing 1. FIG. 7 shows casing 1 with impeller from below, or from inlet opening 6 of casing 1.

It is noted that the invention is not limited to the shown embodiments but also extends to variants within the scope of the appended claims.

It is also noted that the invention can also be applied in turbines. In turbines the flow through the impeller and the rotation of the impeller will take place in opposite directions. The pressure side and suction side of the blade are the same sides for a turbine as well as for a pump, whereby the leakage flow is also in the same direction for both a pump and a turbine. The inlet opening of the turbine is conversely the outlet opening of the pump, and vice versa. Reference is therefore made in the case of a turbine to an inward extending edge on the outlet opening thereof. The pump and turbine can be the same device, the device in that case being a so-called pump turbine.

The invention claimed is:

1. A fish-friendly impeller for a pump or turbine, comprising a casing and the impeller disposed in the casing, the impeller comprising at least one blade, characterized in that the at least one blade includes a standing edge on an outer peripheral edge zone of a pressure side surface of the at least one blade configured to prevent fish from being drawn into a gap between the impeller and the casing of the pump or turbine, wherein the casing includes an inward extending edge at an inlet opening of the casing, the inward extending edge being on an opposite side of the pressure side surface and the standing edge of the at least one blade and wherein the standing edge has a maximum height of approximately 5 cm which decreases close to a foremost and/or rearmost end zone of the at least one blade as seen in the direction of rotation of the impeller to a height of about zero.

2. The fish-friendly impeller as claimed in claim 1, wherein the maximum height of the standing edge is selected in accordance with a size of a fish to be entrained during use and/or a maximum allowable loss of efficiency.

3. The fish-friendly impeller as claimed in claim 1, wherein an angle between the pressure side surface of the at least one blade and the standing edge is between about 60° and about 150°.

4. A fish-friendly pump for pumping water, comprising a casing and an impeller disposed in the casing, the impeller comprising at least one blade, characterized in that the at least one blade includes a standing edge on an outer peripheral edge zone of a pressure side surface of the at least one blade, wherein the casing includes an inward extending edge at an inlet opening of the casing, the inward extending edge being on an opposite side of the pressure side surface and the standing edge of the at least one blade and wherein the standing edge has a maximum height which decreases close to a foremost and/or rearmost end zone of the at least one blade as seen in the direction of rotation of the impeller to a height of about zero.

5. The fish-friendly pump as claimed in claim 4, wherein the maximum height of the standing edge is selected in accordance with a size of a fish to be entrained during use and/or a maximum allowable loss of efficiency.

6. The fish-friendly pump as claimed in claim 4, wherein the standing edge extends substantially parallel to an inner peripheral surface of the casing.

7. The fish-friendly pump as claimed in claim 4, wherein the inward extending edge has a width which is at least about equal to a sum of a thickness of the standing edge of the impeller and a dimension of a gap between the standing edge of the impeller and an inner peripheral surface of the casing.

8. The fish-friendly pump as claimed in claim 4, wherein the inward extending edge has a width of between about 1 mm and about 5 cm.

9. The fish-friendly pump as claimed in claim 4, wherein an angle between an inner peripheral surface of the casing and the inward extending edge is between about 45° and about 150°.

10. A fish-friendly turbine for generating energy from water, comprising a casing and an impeller disposed in the casing, the impeller comprising at least one blade, characterized in that the at least one blade includes a standing edge on an outer peripheral edge zone of a pressure side surface of the at least one blade, wherein the casing includes an inward extending edge at an outlet opening of the casing, and wherein the standing edge has a maximum height which decreases close to a foremost and/or rearmost end zone of the at least one blade as seen in the direction of rotation of the impeller to a height of about zero.

11. The fish-friendly turbine as claimed in claim 10, wherein the maximum height of the standing edge is selected in accordance with a size of a fish to be entrained during use and/or a maximum allowable loss of efficiency.

12. The fish-friendly turbine as claimed in claim 10, wherein the standing edge extends substantially parallel to an inner peripheral surface of the casing.

* * * * *